(12) United States Patent
Coady

(10) Patent No.: US 6,751,628 B2
(45) Date of Patent: Jun. 15, 2004

(54) PROCESS AND SYSTEM FOR SPARSE VECTOR AND MATRIX REPRESENTATION OF DOCUMENT INDEXING AND RETRIEVAL

(75) Inventor: Aric Coady, Ventura, CA (US)

(73) Assignee: Dolphin Search, Ventura, CA (US)

( * ) Notice: Subject to any disclaimer, the term of this patent is extended or adjusted under 35 U.S.C. 154(b) by 165 days.

(21) Appl. No.: 10/043,553

(22) Filed: Jan. 11, 2002

(65) Prior Publication Data

US 2002/0091715 A1 Jul. 11, 2002

Related U.S. Application Data

(60) Provisional application No. 60/261,662, filed on Jan. 11, 2001.

(51) Int. Cl.[7] ............................ G06F 7/00; G06F 17/00
(52) U.S. Cl. ..................................................... 707/101
(58) Field of Search ..................... 707/1, 2, 3, 4, 707/5, 6, 7, 8, 9, 10, 100, 101, 102, 103, 104

(56) References Cited

U.S. PATENT DOCUMENTS

| | | | | |
|---|---|---|---|---|
| 6,041,311 A | * | 3/2000 | Chislenko et al. | 705/27 |
| 6,189,002 B1 | * | 2/2001 | Roitblat | 707/1 |
| 6,192,360 B1 | * | 2/2001 | Dumais et al. | 707/6 |
| 6,477,524 B1 | * | 11/2002 | Taskiran et al. | 707/2 |
| 6,507,829 B1 | * | 1/2003 | Richards et al. | 706/45 |
| 6,571,225 B1 | * | 5/2003 | Oles et al. | 706/12 |
| 6,654,739 B1 | * | 11/2003 | Apte et al. | 707/5 |

* cited by examiner

Primary Examiner—Diane J. Mizrahi
Assistant Examiner—Yicun Wu
(74) Attorney, Agent, or Firm—Dickstein, Shapiro, Morin & Oshinsky, LLP.

(57) ABSTRACT

A new data structure and algorithms which offer at least equal performance in common sparse matrix tasks, and improved performance in many. This is applied to a word-document index to produce fast build and query times for document retrieval.

1 Claim, 4 Drawing Sheets

Indexing a document (1)

Word Vector (1)

| word | frequency |
|---|---|
| 1 | 1 |
|  |  |
| 2 | 2 |

Word Vector (2)

| word | frequency |
|---|---|
| 1 | 2 |
| 3 | 1 |
|  |  |

Word Vector (3)

| word | frequency |
|---|---|
|  |  |
| 3 | 1 |
| 2 | 2 |

FIG. 1

PROCESS AND SYSTEM FOR SPARSE VECTOR AND MATRIX REPRESENTATION OF DOCUMENT INDEXING AND RETRIEVAL

RELATED APPLICATIONS

This application is based on a Provisional Application, Serial No. 60/261,662, filed on Jan. 11, 2001, entitled "Process and System for Sparse Vector and Matrix Representation and Computations."

FIELD OF THE INVENTION

The invention relates to the field of mathematics, and more particularly the computation of sparse matrixes. In mathematical terms, a vector is a sequence of integral keys and corresponding numeric values. A matrix is a two-dimensional grid of key-pairs with corresponding values, or equivalently a vector of vectors. In common practice, many matrices are "sparse," meaning that the majority of the numeric values are zero. The building and manipulation of vectors and matrices is a common mathematical task. The amount of memory consumption and processor time is of critical interest in performing these tasks.

The word-indexing of a set of documents, such as those used in document search engines, can be modeled as a sparse matrix. Because it is desired to both build and query such matrices quickly, and because there data is essentially dispersed at random, they are particularly susceptible to any number of speed tradeoffs made in current sparse matrix implementations.

Typically, a large set of documents are indexed by words they contain. The purpose of the index is to speed up the lookup of words. The words and the documents containing them are represented by a unique identifier, generally an integer. Such an index is a matrix wherein the word is the primary key, yielding vectors in which the document is the secondary key, and finally yielding values such as the occurrence frequency of said word. The invention presents a novel data structure representation for vectors and matrices. Further, the invention presents numerous implementations of common methods on such vectors and matrices. Finally, the invention is applied to improving the performance of document index building and querying.

BACKGROUND AND PRIOR ART

Manipulation of large sparse matrices is a common mathematical task. There are many applications that require a space and time efficient data structure and related methods to perform these computations. However, existing implementations suffer from poor performance in particular tasks, or are specific to matrices of a particular pattern.

To analyze the computational time and memory requirements required for processing an algorithm, standard asymptotic notation (0) will be used. "M" and "N" will represent vectors. "m" and "n" will represent the number of elements in the vectors, respectively.

Many data structures and methods have been used for sparse matrix tasks. The classic method is to simply use arrays to implement vectors, and two-dimensional arrays to implement matrices. There are several benefits to this approach. First and foremost, it is conceptually simple. The vector indices map conveniently onto the array indices, and the adjacency of the values stored in memory is pleasingly similar to how a human would represent them visually. Furthermore, it allows quick, i.e., constant, access time to each value. The usual primitive operations on vectors: addition, multiplication, etc., can all be implemented efficiently - in linear time with respect to the number of values.

However, the memory consumption of arrays is proportional to the product of the matrix dimensions. In other words, arrays store zero values and hence do not take advantage of the sparsity of the matrices. A word-document index may contain a large number of documents, as well as a large number of words. However, a majority of words in the language(s) do not occur in any particular document. Hence such an index is generally a large, but sparse, matrix. For this reason, there is considerable interest in other representations that only require memory allocation proportional to the actual number of nonzero values, while still achieving acceptable operation times.

One such representation make use of "compressed vectors", which are generally stored as parallel arrays of key-value pairs. Pointers are eschewed, as they require additional memory to store the addresses. The key-value pairs can be sorted (by key) or unsorted. The usual tradeoffs apply. Sorted vectors yield a binary search algorithm resulting in $O(\log(n))$ access time. Unsorted vectors requires a linear search algorithm, resulting in $O(n)$ time. But maintaining sorted vectors result in extra overhead for insertion and deletion of entries; the worst-case being $O(n)$ time. A search engineer then needs to process the vector of documents for each word in the query. In order to generate results that are more relevant from a search, it is typically desired that search engines be queried with multiple words, combined with an "AND" or "OR" operation. This in turn results in the merging of multiple word vectors, with a set-like operation of intersection or union. Keeping the vectors sorted thus yield much faster merging for multiple word queries, at the expense of more computation being done during the building of the index.

Compressed matrices consist of an array of compressed vectors keys, with a corresponding full array of compressed vector values. However, unless all the vectors of matrix have similar length, this will still result in a large amount of wasted memory. Such a representation is poor for document indexes because their vectors cannot be expected to be of similar size.

Compressed Sparse Row (or Column) is another common method for sparse matrix representation. The vectors are compressed in the usual manner and concatenated in an order according to their own key. A third array stores the start position of each vector. Access to a given vector is constant, access to a value is $O(\log(n))$, and insertion/deletion is $O(n^2)$. Several variants with the same basic tradeoffs are available.

Storing the matrix relative to a Diagonal (or Skyline) method is also common. Generally these are used if values can be expected to be concentrated along the main diagonal of the matrix. Otherwise, memory reduction is not significant.

All of the above methods offer relatively slow value lookups: $O(\log(N))$ or worse, and extremely poor modification penalties: at least $O(n)$ and generally $O(n^2)$. Furthermore, irrespective of the data structure choice for matrices, unsorted compressed vectors and temporary full-size vectors are generally used in practice.

When a word-document index is queried, generally an entire vector is desired, not just one word-document value. Thus the relatively slow lookup times for individual values is not an issue. However, constructing such an index with $O(n)$ insertion time results in an excruciatingly slow build time. Consequently, it is common to build a forward index first—document by word—and then invert the index—to word by document—for querying. By compiling all the values first, they can be sorted by word, thereby building the inverted index without the O(n) insertion hit.

But this common solution has several drawbacks. It requires a second pass through all the data, thus increasing the time to build the index. It also results in two distinct phases of indexing, a "build" phase and a "query" phase. Hence, the index cannot be effectively used while it is being built, and any updates to the documents cannot be quickly integrated into the index.

In addition to the above shortcomings, querying using compressed vectors can also yield sub-optimal performance times. A query is answered by acquiring the appropriate word vectors, and then merging them together. The merging operation may be as simple as adding the scores for each word-document value. Irrespective of what function is used to merge to values however, there is the overhead of the set operation used to combine the values at issue. Assume there are M query words each of which have any average word vector length of N. If the query is an OR of the words, these vectors must be unioned together. Hence, there are potentially $O(M*N)$ result documents, which is a convenient lower bound for how long such a union operation can take. Unfortunately, if the vectors must be kept in a standard compressed format—even if they are sorted by document—the union operation can be shown to take $O((M^2)*N)$. It is typical to unpack each vector into an uncompressed format to overcome this. However, this workaround assumes there is sufficient memory to unpack a vector. It may be the case that the range of possible vector values is orders of magnitude larger than the actual size of the vectors, making this unreasonable in practice.

The situation is even worse in an AND operation, where the vectors need to be intersected. It can be easily shown that the intersection operation must take at least $O(M*N)$ time, as all the values need to be scanned. In practice it may be even longer, depending on small the resulting vector is. Surprisingly, $O(M*N)$ is not optimal in this case: all the values don't have to be scanned. Only the smallest vector remaining needs to be scanned to intersect it with another, and the result vector continues to get smaller. However, the standard algorithm cannot take advantage of this fact, nor does uncompressing the vector help the situation, because than the larger range of possible values must again be scanned.

In conclusion, it has been shown that the prior art methods of vector and matrix representation have several shortcomings, especially as related to common search engine operations. Both indexing and querying have sub-optimal operations with respect to time. It is therefore desirable to create a new implementation which improves operations to their optimal limits, while keeping the amount of memory consumed to be proportional to existing methods. This new implementation will require the use of an existing data structure: a hash table.

A hash function refers to mapping from an arbitrary domain to a restricted range, usually consisting only of integers and of smaller size. It performs a transformation that takes an input m and returns a fixed-size string, which is called the hash value h (that is, h=H(m)). Though the function cannot be one-to-one, it is desirable to have a minimal number of collisions (i.e., having more than one key map to the same position). Furthermore, it is generally desirable that the output of the function be statistically random, so that the hash values aren't clustered. Hash functions almost always end with a modulo operation, thereby yielding an integer in the desired range. For some applications, merely a modulo hash function is adequate.

Hash tables are a well-known data structure, in which keys are mapped to array positions by a hash function. The table is simply an array of key-value slots. Keys are processed through a hash function that yields an index of a slot in the table. Values are then inserted, deleted, or modified in the slot as necessary after a key lookup. The result is constant access time, albeit a higher constant than with arrays.

Collisions occur if two different keys hash to the same slot. There are generally two ways of resolving collisions. "Changing" refers to putting multiple values together, linked to the slot. As this requires the use of pointers, which result in additional memory and time overhead, it is often not preferred. "Open addressing" (or "open indexing") is the alternate method of resolving collisions. In addition to the initial hash, there is a probe sequence based on the hash value that iterates until the correct slot, or an empty slot, is found. This probe sequence must be deterministic and never repeat a slot. There are several well-known algorithms for implementing such a sequence. Although collisions naturally increase access time, it can be shown the statistical expectation of look-up time is constant with reasonably sized hash tables. It is typical to keep the hash table half fall, and double its size when growing, to achieve acceptable performance. Deletion is handled by inserting a dummy key into the empty slot. A dummy key is necessary to be distinguished from a null key, so that the probe sequence will continue if necessary.

OBJECT OF THE INVENTION

It is an object of the invention to present a novel data structure and applicable methods for sparse vectors and matrices computations with optimal operation limits, while keeping the amount of memory consumed to be proportional to existing methods. It is another object of the the invention to present the following features: Modification of values occurring in constant time; Operations on vectors occurring in linear time as appropriate; and total memory consumption being linear with respect to the number of nonzero values.

It is a further object of the invention to combine these features to enable the sparse matrix representation to be used for a searchable word-document index to produce fast build and query times for document retrieval. The index could be built in linear time (with respect to the number of nonzero values), and can be queried in constant time. Furthermore, no conversion between build or query modes would be necessary. The index can be queried even as it is being built.

SUMMARY OF THE INVENTION

A new data structure and algorithms is presented which offer performance at least equal to the prior art in common sparse matrix tasks, and improved performance in additional tasks. Further, this representation is applied to a word-document index to produce fast build and query times for document retrieval.

Under this new data structure, matrices and vectors are represented as dictionaries of key-value pairs. A vector is a dictionary of integral keys and corresponding numeric values. A matrix is a dictionary of integral keys and corresponding vector values. The dictionaries themselves are implemented using hash tables. When a key is looked up, it is hashed, and its corresponding slot (which may be empty)

is found in the hash table. The value of the slot is then retrieved, inserted, or deleted as appropriate. The hash function used is a modulo of the key itself.

The departure from more traditional representations in the prior art is that the context of the values are no longer relevant. Values are not kept sorted, or even spatially organized at all. The tradeoff is the emphasis on constant time access and modification, which is generally unavailable in other methods. Though it is not surprising that such a dictionary could be used to build a vector, the fact that the random organization of the values will be shown to be advantageous to numerous computations is novel and non-obvious.

The resulting implementation yields memory use that is comparable or better than other known methods, and at the same time yielding computation efficiencies that are comparable or better than other known methods. Further, certain computations will be shown to be superior to all known methods.

The constant insert and access time will be shown to implement an extremely fast document index. Additionally, fast set operations on the vectors will be shown to implement multiple word queries efficiently. See FIG. 1.

BRIEF DESCRIPTION OF THE DRAWINGS

FIG. 1 is an abstract representation of a document represented as a word vector.

DETAILED DESCRIPTION OF THE INVENTION

In the preferred embodiment of the invention, the dictionary implementation of vectors using hash tables with the indices as keys, and the entries as values. Vectors are hash tables of integer-number pairs. Matrices are hash tables of integer-vector pairs. Insertion and deletion of values are done in constant time, and memory requirement is linear with respect to the number of pairs - both within small constant factors. A unique word identifier is the primary key. A unique document identifier is the secondary key. The value is non-null if the given word appears in the given document.

Figure 2:
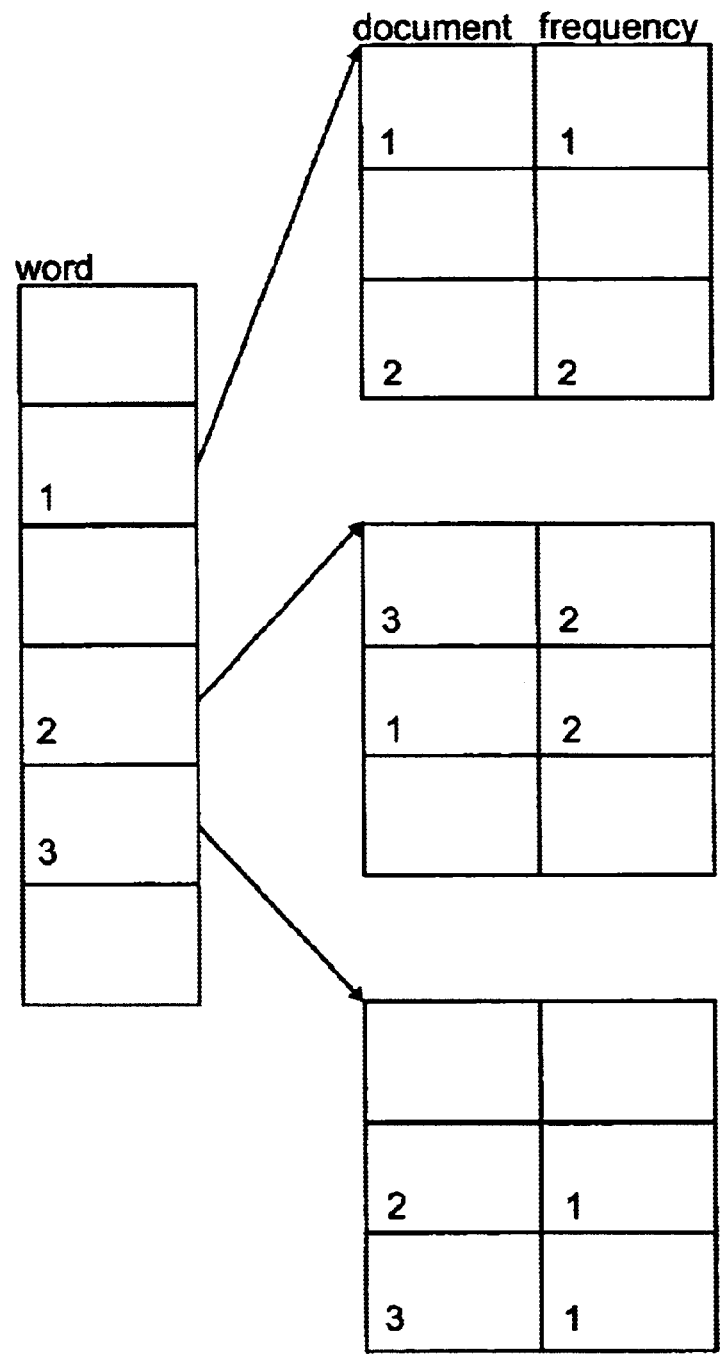
FIG. 2 is an abstract representation of an inverted word matrix.

Variations include scaling to higher dimensions. Caching of commonly used vectors can be done. Note that the matrix is transposed in a particular orientation, i.e. either its rows or columns are available as a unit. This is common in other implementations, however, and it is feasible if memory is adequate to maintain both orientations. Again constant time modification is what makes this possible. For a document index, just one orientation - word by document - is sufficient. Because queries are always done with words. See FIG. 2 for an abstract representation of an inverted word matrix.

Consider some primitive unary vector operations, where n is the number of nonzero elements in the vector. Any operation performed on a particular value of the vector is assumed to run in constant—O(1)—time. All operations are assumed to be destructive, i.e., altering the vector is allowed. When this isn't the case, the vector can obviously be copied first.

Scan

Scanning a vector simply refers to iterating over its values. The table can be iterated just as any array, while ignoring null and deleted keys. And the hash table size is of course proportional to the number of elements. Thus this is trivially O(n) time, just as with any sparse vector representation.

Map

Mapping refers to apply a function to each value in a vector. The vector is scanned, while overwriting the values with the result of the function. O(n) time.

Filter

Filtering refers to remove some elements of the vector based on a conditional test. The vector is scanned, while deleting the keys of values which don't pass the condition. O(n) time.

Alternatively, a new vector can be constructed with the values that do pass the condition. This will also be O(n) time, but with higher constants due to memory allocation. The tradeoff is simply whether the deleted keys would cause sufficient performance degradation to warrant the memory allocation overhead. In practice, this is rare. But the option is available.

Reduce

Reduction refers to apply a binary function to pairs of values, recursively. So the result of the function is a single value, and the vector itself is unchanged. Again, the vector can be scanned with the function and one current value in O(n) time.

These few operations cover the basic primitives, from which common mathematical tasks can be trivially achieved. All of them run in O(n) time, just as with any normal implementation. A sampling follows.

Sum

The sum of a vector's value is implemented by Reduce with addition as the binary operator and 0 as the initial value.

Product

The product of a vector's value is implemented by Reduce with multiplication as the binary operator and 1 as the initial value.

Scalar Multiplication

Multiplying the vector's value with a scalar is implemented by Map, with the described scalar function.

Now we consider some primitive operations on two vectors. Destruction on the first vector is again assumed. Let the vectors M and N be sized m and n, respectively.

Union

The combination of two vectors such that values with matching keys are combined with a provided function, and non-matched values are retained. Scan N, and look up each key in M. If a value is found, then combine the two values and overwrite the value in M. If a values in not found, then insert N's key and value. Only N is scanned, and all other operations are constant, hence O(n) time.

Intersection

The combination of two vectors such that values with matching keys are combined with a provided function, and non-matched values are considered 0. Scan M, and look up each key in N. If a value is found, then combine the two values and overwrite the value in M. If a value is not found, then delete the value from M. O(m) time.

As with filtering, a deleting operation such as this has a nondestructive variation. Simply, surviving values are inserted in a new vector, as opposed to deleted values being removed from the old one. The same tradeoffs apply. However, another advantage presents itself in this case because the operation is binary. The nondestructive version is obviously commutative. Thus the smaller of M and N could be chosen to be scanned, yielding an improved O(min (m, n)) running time.

Addition

The addition of two vectors is implemented by Union with addition as the binary function. Running time is O(n).

Multiplication

The multiplication of two vectors is implemented by Intersection with multiplication as the binary function. Running time is O(m).

Dot Product

The dot product of two vectors is the sum of the products of their corresponding pairs. Thus is it implemented by Multiplication followed by Sum of the resulting vector. Running time is O(m).

Now we consider many of the basic operations performed on large groups of vectors, namely matrices. Let there be m vectors of average length n. A matrix will be implemented as a vector of vectors.

A vector is obviously only missing from the matrix if no values of that vector are present. Thus even if the matrix has a overall low density, its number of vectors will be considerably more. Hence, even a sparse matrix doesn't necessarily need a sparse representation for its vector, let alone the same representation. Hence, the invention described herein can be used in its vector form only, in conjunction with any number of matrix representations. For simplicity, we will assume the main vector of the matrix is itself a hash table implementation.

Sum

To sum the vectors of a matrix, create a new empty vector. Iterate over the input vectors, performing destructive addition from each. Running time is simply $O(m*n)$.

Now consider vector summation of other implementations. If the vectors are kept compressed, then their binary addition is O(m+n), as both vectors must be scanned. As the result vector grows, the running time exhibits quadratic behavior, yielding a much slower $O(m*n^2)$. Thus, Sum is an order of magnitude faster than existing implementations.

If memory is available to expand the vector, then only successive vectors need to be to scanned each time. This results in the equivalent $O(m*n)$ running time. But this comes at the cost of more memory, and the assumption that the vector key can reasonable be represented in an array. In the case of a document index, this depends on how the word and document identifiers were created, as well as how many there are. Certainly in many cases, the sheer number of documents will cause an expanded vector to be infeasible.

Product

To compute the product of the vectors, copy the first vector. Iterate over the remaining input vectors, performing multiplication from each. Running time is worst-case $O(m*n)$. However, as the vectors are sparse, their values most likely do not overlap. Given normally distributed data, a running time is O(n) is expected as the result vector continues to reduce in size by its density factor with each iteration.

By contrast, standard implementations can regardless expect a running time of $O(m*n)$ in all cases. Even uncompressing the result vector does not aid the situation, as it did with Sum, because the its the smaller vector that is scanned. Whereas this implementation can be optimized to a rare sublinear running time. The expected running time of Product is a full order of magnitude faster.

Gaussian Elimination

Gaussian elimination refers to solving a system of multivariate linear equations. The coefficients of these equations are commonly represented as vector values; the unknown variables of these equations are commonly represented as vector keys.

A standard method of gaussian elimination is as follows. Select a single vector and a single key-value pair of that vector to act as a pivot. A scalar multiple of the pivot vector is then added to every other vector such that the pivot value in the new sum will become zero. The process iterates until all vectors have been pivoted. The resulting sparse matrix should then consist of vectors of one value only, if there is a single consistent solution.

Let there be m vectors in the matrix, with an average length of n. Addition of vectors requires O(n) time and the vectors are scanned in a double nested loop. So standard gaussian elimination then requires $O(n*m^2)$ time. Note that gaussian elimination essentially makes a sparse matrix even sparser, by attempting to reduce the length of each vector to constant size. Furthermore, it is common practice to pivot around smaller vectors, thereby maximizing the amount of values removed from the matrix. Hence, the length of the pivot vector can be expected to approach constant size instead of linear size.

But existing vector representation can not take advantage of this because their addition takes time proportional to the total length of both vectors. Adding a hash-table vector of constant size, however, takes only constant time. Thus gaussian elimination can approach $O(m^2)$ time, a order of magnitude speedup.

These primitives are sufficient to demonstrate the implementation of a word-document index. As described, the index will be kept inverted at all times. The word and document identifiers may be any value which is practically hashable.

Building

Figure 3:
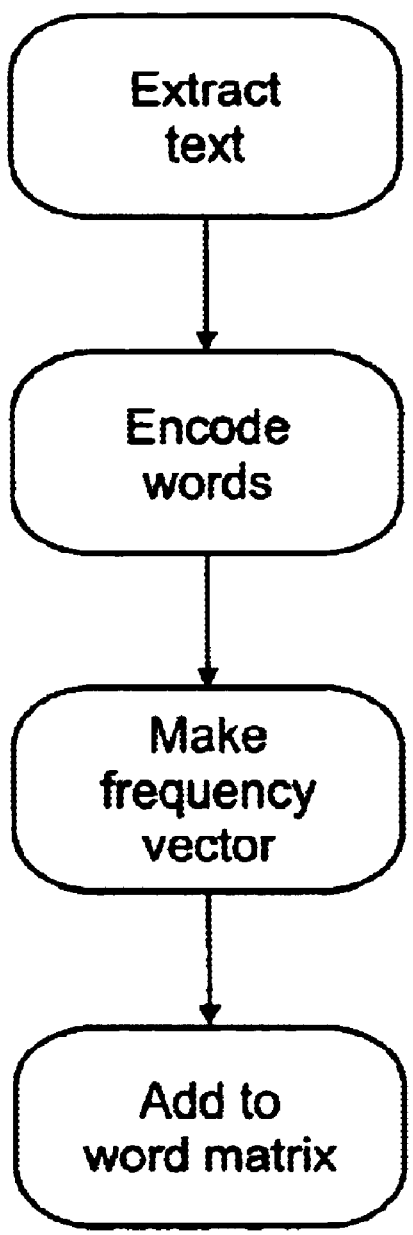
FIG. 3 is a representation of indexing steps.

First the text of document is processed in any conventional manner to produce a word vector. The word are keys, and the values are whatever is desired: often a frequency count. The word vector is Scanned, and each value is added to the index matrix. Since each insert is constant, the addition of a document is linear with respect to number of unique words in the document, as desired. See FIG. 3 for a representation of indexing steps.

Querying

For each word in the query, its document vector is retrieved from the matrix in constant time. If the words in the query are weighted, their weights can be applied with a linear time Scale operation on each vector.

Next, the vectors need to be combined to yield the total scores for each document. As demonstrated earlier, which actual binary function is used to combine two values is orthogonal to the set operation used to combine the vectors. Typically, a search engine will support some of three boolean operations: OR, AND, and NOT. OR means some of the words must appear in the document. AND means all the words must appear in the document. NOT means the words must not appear in the document. The OR operation translates into a Union set operation. The AND operation translates into an Intersection set operation. The NOT operation translates into a Filter operation, after the vectors have already been merged.

Figure 4:
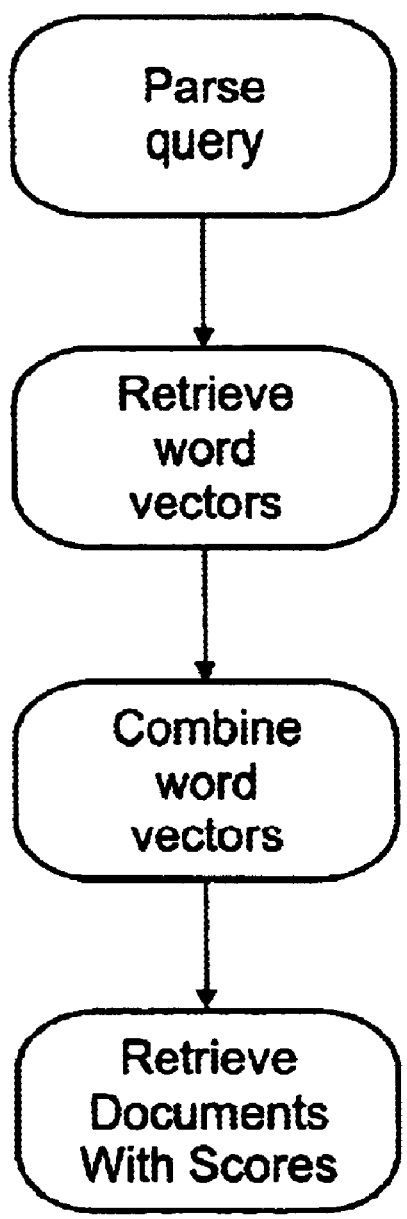
FIG. 4 is a representation of query steps.

As describe under matrix Sum and Product, the merging of these vectors can be expected to be an order of magnitude faster than a representation of sorted document-value pairs. Furthermore, maintaining the values in sorted order is more time consuming than the hashed index. See FIG. 4 for a representation of query steps.

The result is now a single vector, whose keys are document identifiers and whose values are the merged data from each corresponding word vector. Those values can now have a function mapped across them to finish the scoring process.

Finally the vector is used to actually display results to the user, as desired by the search engine.

The document-score pairs can be removed from vector form whenever constant time access is no longer desired. For example, a list of results can be generated and sorted by score, so the user sees the best results first. Note also, the number of results can be cut by score first before sorting. Partitioning a group of documents by score will generally be faster than sorting all of them. And generally the document key is just some unique identifier which is used to retrieve other data of the document from a database, e.g., title, summary, location. These document objects are then displayed in whatever manner desired.

Updating

Often search engines must respond to changed or deleted files from their index set. This is especially true on local machines, where a user may expect their document changes to be reflected in their operating system's find utility virtually instantaneously.

This presents no problem for index as it can be queried and built simultaneously. The text of the deleted or old document is removed from matrix in linear time. And the text from the added or new document is inserted in linear time.

Storage

Though the implementation of the vectors and matrices was discussed as if they were in memory, the analogous data structure can be kept on disk. This may be necessary if the machine does not have enough main memory to hold the entire index.

The foregoing merely illustrates the principles of the present invention. Those skilled in the art will be able to devise various modifications, which although not explicitly described or shown herein, embody the principles of the invention and are thus within its spirit and scope.

REFERENCES

Knuth. Sorting and Searching, volume 3 of The Art of Computer Programming. Addison-Wesley, 1973.

Cormen, Leiserson, Rivest. Introduction to Algorithms. McGraw-Hill, 1990.

Fraleigh, Beauregard. Linear Algebra. Addison-Wesley, 1990.

Duff, Erisman, Reid. Direct Methods for sparse Matrices. Oxford. 1986.

Belew. Finding Out About. Cambridge University Press. 2000.

What I claim is:

1. A memory-efficient implementation of sparse vectors using hash tables, said implementation representing the occurrence of words in a collection of documents, wherein:

said sparse vectors are hash tables of integer-number pairs, said hash tables has keys as indices, a unique word identifier as primary key, a unique document identifier as secondary key, and values as entries, said values are non-null if a given word occurs in a document, modification of values occur in constant time, operations on vectors occur in linear time as appropriate, and total memory consumption being linear with respect to the number of nonzero values.

\* \* \* \* \*